United States Patent [19]

Schmidlin

[11] 4,348,956

[45] Sep. 14, 1982

[54] ARTILLERY SHELL COMPRISING TWO SECTIONS HAVING COMPLEMENTARY COUPLING MEMBERS FOR CONNECTING THE SECTIONS TOGETHER

[75] Inventor: Albertus E. Schmidlin, Caldwell, N.J.

[73] Assignee: The United States of America as represented by the Secretary of the Army, Washington, D.C.

[21] Appl. No.: 182,358

[22] Filed: Aug. 29, 1980

[51] Int. Cl.³ .............................................. F42B 15/10
[52] U.S. Cl. .................................. 102/377; 285/330; 285/403; 403/321; 403/359
[58] Field of Search .................... 102/374, 377, 378; 285/403, 404, 330; 403/321, 322, 359, 326, DIG. 6

[56] References Cited

U.S. PATENT DOCUMENTS

| | | | |
|---|---|---|---|
| 2,220,610 | 10/1940 | Miller | 403/359 |
| 2,721,517 | 10/1955 | Workman | 102/377 |
| 3,183,024 | 5/1965 | Myers | 285/404 X |
| 3,306,633 | 2/1967 | Haake | 102/377 X |
| 4,094,539 | 6/1978 | Reimert | 285/403 X |
| 4,124,318 | 11/1978 | Sagady | 403/359 X |

*Primary Examiner*—Harold J. Tudor
*Attorney, Agent, or Firm*—Nathan Edelberg; Robert P. Gibson; A. Victor Erkkila

[57] ABSTRACT

An artillery shell is provided comprising two sections having complementary coupling members for connecting the sections together. The complementary coupling members include at least two locking assemblies which can be engaged to prevent relative axial movement of the coupled sections or disengaged to permit the disconnection of the sections. As a result, the sections can be connected and disconnected for different mission requirements and for inspection purposes.

10 Claims, 6 Drawing Figures

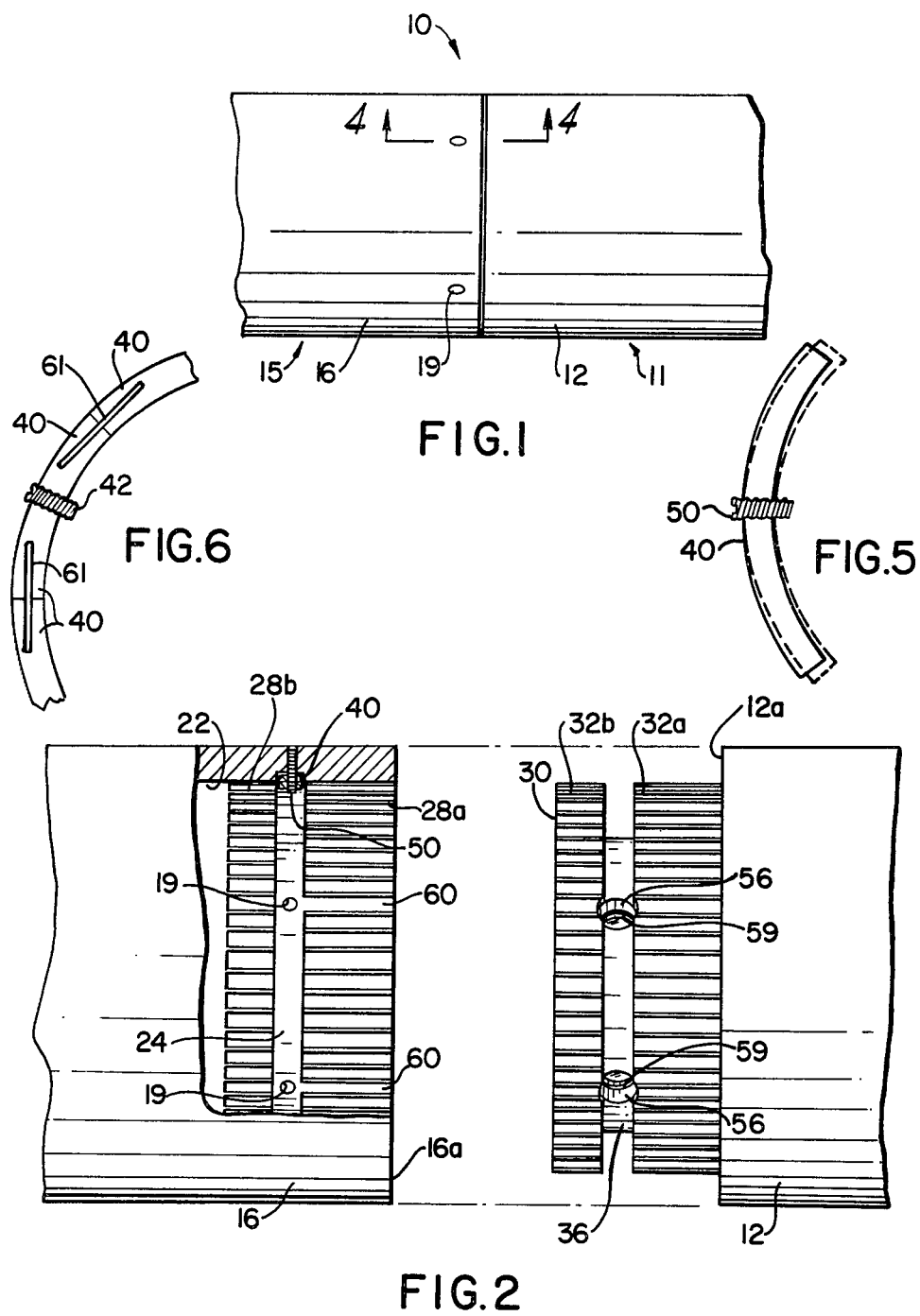

ARTILLERY SHELL COMPRISING TWO SECTIONS HAVING COMPLEMENTARY COUPLING MEMBERS FOR CONNECTING THE SECTIONS TOGETHER

STATEMENT OF GOVERNMENT INTEREST

The invention described herein may be manufactured, used and licensed by or for the government for governmental purposes without the payment to us of any royalties thereon.

FIELD OF THE INVENTION

The present invention relates to an artillery shell comprising two sections having complementary coupling members which can be engaged with one another to connect the sections together.

Even more particularly, the present invention relates to such artillery shells in which the complementary coupling members are disengageable so that the sections once coupled can be disconnected.

BACKGROUND OF THE INVENTION

Artillery shells comprising two sections connected together have been known for many years. The advantage of constructing an artillery shell having two sections is that the artillery shell can be adapted for different mission requirements. For instance, one of the sections can comprise a conventional warhead and the other of the sections can comprise a rocket motor. After the connection of the sections, the artillery shell can be conventionally loaded in the breech of a field piece and fired.

The aforementioned known artillery shells have complementary coupling members attached to the ends of their sections. Known complementary coupling members have included an externally threaded male member attached to one of the sections and an internally threaded female member located in the other of the sections to produce a conventional threaded spigot joint between the sections. Torsional and axial loads between the sections are absorbed by pins extending through the sections and the male and the female members.

The disadvantage of the connection as described hereinabove, is that once the pins are set in place the sections of the artillery shell can not be disconnected. Thus, once the artillery shell is assembled, it can not be disassembled should mission requirements change. Additionally, when one of the sections is a rocket motor, it is often desirable to periodically inspect the rocket motor. This cannot be easily done if the rocket can not be disconnected from the war head.

In accordance with the foregoing, it is an object of the present invention to provide an artillery shell comprising two sections having complementary coupling members which can be engaged to connect the sections of the artillery shell into an abutting relationship and disconnected to permit the sections to be changed or inspected.

SUMMARY OF THE INVENTION

The present invention provides an artillery shell comprising a first section, a second section, and complementary coupling means for removeably connecting the first and second sections to each other. The complementary coupling means include coaxial coupling means for coaxially coupling the sections, relative rotation means for preventing relative rotation of the coupled sections, and locking means for preventing relative axial movement of the coupled sections. The locking means includes at least two locking assemblies which can be engaged to prevent axial movement or disengaged to permit the disconnection of the sections. Because of this latter feature of the present invention, the sections can be disconnected for different mission requirements and for inspection purposes.

As a preferred embodiment, each of the locking assemblies can include a movable segment and a threaded member for threadably engaging the movable segment. The threaded members and their threaded engagement with the movable segments permits the movement of the segments to a locking position and the movement of the segments from the locking position to an unlocked position whereby the sections can be disconnected.

As a preferred embodiment, the first section has a first end section and the second section has a second end section which abuts the first end section when the sections are connected to each other. In one embodiment, the coaxial coupling means can comprise a cylindrical coaxial projection connected at one end to the first end section and a coaxial bore located in the second end section. The coaxial bore is configured to slidably receive the cylindrical projection when the end sections are brought together in an abutting relationship.

As another preferred embodiment, the locking means can include a circumferential external groove about the periphery of the cylindrical projection and a circumferential internal groove located about the internal periphery of the bore. The internal groove is located within the bore so as to be disposed opposite to and surround the external groove when the end sections are brought together. In accordance with this embodiment of the present invention, each of the movable segments can have a width less than the interior width of the grooves and a height such that the movable segments in their unlocked position are operable to be fully disposed within the external groove to permit relative movement of the grooves and the movable segments in their locking position are operable to be disposed partially within the internal groove and partially within the external groove to prevent relative movement of the grooves. As a result, when the segments are in their locking position, relative axial movement of the sections is prevented; and when the movable segments are in their unlocked position, relative axial movement between the sections will be permitted such that the sections can be disconnected.

As another preferred embodiment, each of the segments can have at least a centrally threaded bore communicating between the outer and the inner surfaces of the segments. The second end section can have a plurality of openings in registry with the internal groove and in registry with the threaded bore when the segments are installed within the internal groove and the end sections are brought together in an abutting relationship. In accordance with this embodiment of the present invention, the threaded members can be threadably engaged within the threaded bores and a tool can then be extended through the openings to tighten the threaded members against the cylindrical projection in order to thereby move the segments from their unlocked position to their locking position.

As another preferred embodiment, the segments include bevelled surfaces or edges, preferably for engagement with corresponding surfaces of the internal groove so that the large centrifugal forces which can act therein will tend to compliment the tightening of the threaded members. This can thus provide an additional positive holding force on the segments after spinup of the shell, even if the threaded members or screws were to loosen.

As another preferred embodiment, the relative rotation means can include a first row of external splines about the external periphery of the cylindrical projection on one side of the external groove and at least a first row of internal splines located about the internal periphery of the bore on one side of the internal groove. The internal splines match the external splines so that the external splines can intermesh with the internal splines to thereby prevent relative rotation between the sections.

As yet still another preferred embodiment, the relative rotation means can further include a second row of external splines disposed about the external periphery of the cylindrical projection on the other side of the external groove and opposite to the first row of external splines and an second row of internal splines disposed about the internal periphery of the bore on the other side of the groove and opposite to the first row of internal splines.

BRIEF DESCRIPTION OF THE DRAWINGS

For a more complete understanding of the present invention, reference may be had to the following description of an exemplary embodiment, taken in conjunction with the accompanying figures of the drawings in which:

FIG. 1 is a partial perspective view of the assembled artillery shell of the present invention.

FIG. 2 is an elevational view of the artillery shell illustrated in FIG. 1 with the sections disconnected, with a portion of the second section cut away and with a locking assembly shown in a partial cross-sectional view in its locking position.

FIG. 5 is an elevational, side, partially phantom view of one of the movable segments of the locking assembly in its free and installed states.

FIG. 6 is a partial, sectional view of a portion of another embodiment of the locking assembly of the present invention.

DESCRIPTION OF AN EXEMPLARY EMBODIMENT

Figure 3:
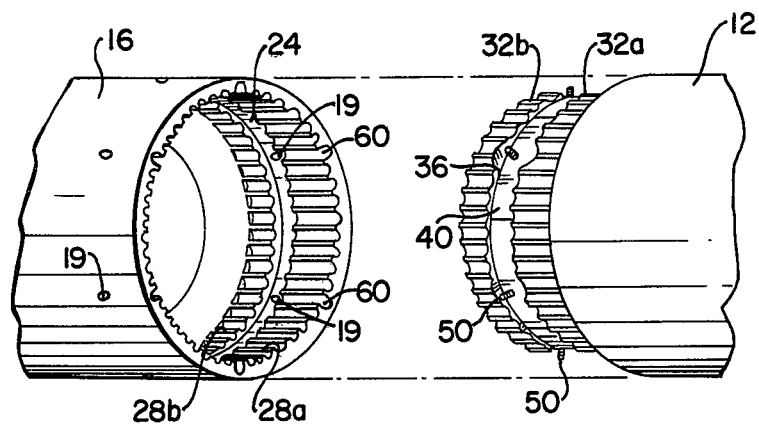
FIG. 3 is a perspective view of the artillery shell shown in FIG. 1 with its sections disconnected to illustrate the complementary coupling members prior to the connection of the sections.

While the present invention is by no means limited to the embodiment illustrated herein, the invention will for simplicity be described in connection therewith.

Referring now to FIGS. 1 and 2, there is illustrated an exemplary embodiment of an artillery shell 10 of the present invention. The artillery shell 10 generally comprises a first section 11 having a first end section 12, and a second section 15 having a second end section 16. The first end section 12 and the second end section 16 are provided with complementary coupling means to connect the first and second sections 11 and 15 together. The complementary coupling means include a coaxial cylindrical projection 30 connected to first end section end 12, and a coaxial bore 22 located in the second end section 16. The coaxial bore 22 is configured to slidably receive the cylindrical projection 30 in order to coaxially couple the sections 11 and 15. The cylindrical projection 30 and the coaxial bore 22 have external and internal first and second rows of splines 32a and 32b; and 28a and 28b, respectively, which splines serve as relative rotation means for preventing relative rotation of the coupled sections 11 and 15. The complementary coupling means of the present invention also comprise locking means which include locking assemblies, each of which has a movable segment 40 and a threaded member 50. The locking assemblies can be engaged to prevent relative axial outward movement (i.e. so as to prevent separation) of the coupled first and second sections 11 and 15, and disengaged to permit the disconnection of the sections 11 and 15. Relative axial inward movement, on the other hand, is prevented by the abutment of end face 16a of the second end section 16 on the step 12a of the first end section 12.

Figure 4:
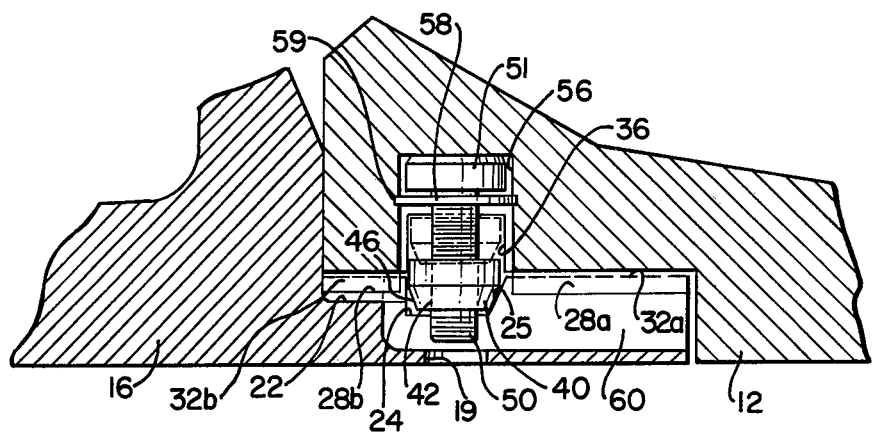
FIG. 4 is a partial cross-sectional view, taken along section line 4—4 of FIG. 1, illustrating the movable segment of the locking assemblies in its locking position and in its unlocked position.

Referring now to FIGS. 2, 3 and 4, the locking means also include an external groove 36 about the periphery of the cylindrical projection 30 and an internal groove 24 within the internal periphery of the coaxial bore 22. As best seen in FIG. 4, the internal groove 24 is located within the bore 22 so as to be disposed opposite to and surround the external groove 36 when the end sections 12 and 16 are brought together in an abutting relationship. The aforementioned movable segments 40 can comprise arcuate members which can be fabricated by cutting a preformed annulus into six equal segments. Each of the movable segments 40 is provided with a threaded bore 42 located through its center. The threaded members 50 are configured to threadably engage within the threaded bores 42; and, in a manner which will be discussed in more detail hereinafter, the threaded members 50 serve to move the segments 40 from their unlocked position to their locking position and vice versa.

Referring specifically to FIG. 5, one of the movable segments 40 is shown. The segment is designed so that it has the shape of a curved beam with a radius of curvature in its free state which is greater than the radius of curvature which it assumes when it is installed and tightened into the groove, i.e., which is therefore greater than the radius of the internal groove located about the internal periphery of said bore at the point where the segments engage the groove (see FIG. 2). Thus, the segment becomes preloaded as screw 50 is tightened, and can therefore retain its holding power along its entire length even after some seating has occurred due to the stresses created in the projectile. In this regard, it is acting as a positive locking device even after some relaxation of the screw loading.

FIG. 4 illustrates the locking action of the movable segments 40 and the internal and external grooves 24 and 36. The locking position of the movable segments 40 is shown in the illustration by solid lines and the unlocked position of the movable segments 40 is shown by phantom lines. In order to produce a tight fit, the groove 24 should preferably have a taper 25 along its side closest to the first end section 12 as viewed when the end sections 12 and 16 are brought together in an abutting relationship; and each of the segments 40 should preferably be provided with a bevel 46. As a result of such an arrangement, when the segments 40 are brought from their unlocked position into their locking position, the bevel 46 bears against the taper 25 as the segment 40 is constrained to move outward in a purely radial direction because of its engagement in internal groove 24, to securely lock the sections 11 and 15 together. As mentioned previously, after spinup, this bevelled structure also provides an additional positive holding power due to the centrifugal forces therein, even if the screws were to loosen somewhat. The movable segments 40 should be sized so that they have a width less than the interior width of the internal and external grooves 24 and 36 and a height so that the locking segments 40 when in their locking position will be partially disposed within the external groove 36 and partially disposed within the internal groove 24 to prevent relative movement of the internal and external grooves 24 and 36. Additionally, the locking segments 40 should be sized to be fully within the external groove 36, when the movable segments 40 are in their unlocked position to permit relative movement of the internal and external grooves 24 and 36.

The complementary coupling means are preferably provided with a retaining means for retaining the movable segments 40 within the external groove 36 before the connection of the sections 11 and 15. Such retaining means aid in decreasing the difficulty of installing the movable segments 40 on the cylindrical projection 30. In accordance with this, each of the threaded members 50 has an enlarged head portion 51. Additionally, retaining rings 58 are provided. The threaded members 50 are extended through the retaining rings 58 and then threaded through the threaded bores 42. As can be seen in FIG. 2, the cylindrical projection 30 is provided with a plurality of radial bores 56 located in the bottom peripheral surface of the external groove 36 so as to be in registry with the threaded bores 42 when the movable segments 40 are installed within external groove 36. The radial bores 56 are sized to accomodate the head portions 51 of the threaded members 50. The radial bores 56 have annular retaining grooves 59 in their internal peripheral surface.

After the threaded members 50 are placed in the radial bores 56, the retaining snap rings 58 are installed in the grooves 59, and the threaded members 50 are threaded through the threaded bores 42, the movable segments 40 can be installed within the external groove 36 with the head portions 51 of the threaded members 50, retained by the snap rings 58, located in the radial bores 56. As a result, and as illustrated in FIG. 3, the movable segments 40 are held in place within the external groove 36.

As illustrated in the Figures, openings 19 are provided in the second end section 16 in registry with the internal groove 24 and in registry with the threaded bores 42. The purpose of openings 19 is to allow a tool to be inserted therein after the movable segments 40 are installed within the external groove 36 and the end sections 12 and 16 are brought together into an abutting relationship. Through manipulation of such a tool, the threaded members 50 can be tightened against the cylindrical projection 30 to thereby move the segments 40 between their unlocked and locking positions. Although not illustrated, the tool can comprise an Allen wrench and each of the threaded members 50 can be provided at one end with an Allen socket.

Additionally, as shown in FIG. 6, the present invention also contemplates using threaded members 50 without head portions 51. In such an embodiment, the aforementioned retaining means can be replaced by wiring the movable segments 40 together by means of flexible orientation pins 61 connected at opposite ends to adjacent movable segments 40. In accordance with such an embodiment, the movable segments 40 are installed within the external groove 36 without the threaded members 50. After the end sections 12 and 16 are brought into an abutting relationship, the threaded members can be passed through the openings 19 and threadably engaged within the threaded bores 42.

Referring again to FIGS. 2 and 4, as a preferred embodiment, the threaded members 50 can be sized so that they have a length greater than or equal to the sum of the thickness of the movable segments 40 and the distance of travel of the movable segments between their locking and their unlocked positions. As a result, after assembly of the movable segments 40 within the external groove 36, a portion of the threaded members will extend through the threaded bores 42. In order to permit the end sections 12 and 16 to be brought into an abutting relationship, a plurality of axial grooves 60 are provided within the axial bore 22. The axial grooves 60, are at one end in registry with the openings 19. When the end sections 12 and 16 are brought together, the protruding portions of the threaded members 50 pass within the axial grooves 60.

In the exemplary embodiment, the relative rotation means for preventing relative rotation of the sections 11 and 15 can comprise at least a first row of splines 32a about the external periphery of the cylindrical projection 30 to one side of the external groove 36 and at least a first row of internal splines 28a located about the internal periphery of the bore 22 to one side of the internal groove 24. Additionally, second rows of external and internal splines 32b and 28b can be provided on the other sides of the external and interal grooves 36 and 24 and opposite to the first row of splines 32a and 28a. The second rows of splines 32b and 28b aid in engaging the splines with each other when the end sections 12 and 16 are brought together. The external splines 32a and 32b and the internal splines 28a and 28b should match one another so that they intermesh. A preferred spline configuration is one that incorporates a 30° pressure angle, flat root, side fit having a 16/32 pitch as described in the standard ANSI B92.1—1970.

It is understood that the embodiment described and illustrated herein is merely an exemplary embodiment and that a person skilled in the art may make many variations and modifications without departing from the spirit and scope of the present invention. All of such variations and modifications are intended to be included within the scope of the invention as defined in the appended claims.

I claim:
1. An artillery shell comprising:
a first section including a first end section,
a second section including a second end section which abuts said first end section when said sections are connected to each other,
complementary coupling means for removably connecting said first and second sections to each other, said complementary coupling means including coaxial coupling means for coaxially coupling said sections, wherein said coaxial coupling means comprises a cylindrical coaxial projection connected at one end to said first end section and a coaxial bore located in said second end section configured to slidably receive said projection when said end sec- tions are brought together in an abutting relationship, relative rotation means for preventing relative rotation of the coupled sections, and locking means for preventing relative axial movement of the coupled sections, wherein said locking means includes:

(a) a circumferential external groove about the periphery of said cylindrical projection and a circumferential internal groove located about the internal periphery of said bore, said internal groove located within said bore so as to be disposed opposite to and surround said external groove when said end sections are brought together, and (b) at least two locking assemblies which can be engaged to prevent axial movement or disengaged to permit the disconnection of said sections, wherein each of said locking assemblies includes a movable segment and a threaded member for threadably engaging said movable segment, for moving said segment into said internal groove to a locking position and for moving said segment out of said internal groove to an unlocked position whereby said sections can be disconnected, and wherein each of said segments is an arcuate member having a radius of curvature which is greater than the radius of said internal groove, whereby said radius of curvature of said arcuate member decreases as said segments are moved into their locked positions.

2. The artillery shell of claim 1, wherein each of said movable segments has a width less than the interior width of said grooves and a height such that said movable segments in their unlocked position are operable to be fully disposed within said external groove to permit relative movement of said grooves so that said sections can be disconnected and said movable segments in their locking position are operable to be disposed partially within said internal groove and partially within said external groove to prevent relative movement of said grooves so that relative axial movement of said sections is prevented.

3. The artillery shell of claim 2, wherein each of said segments has at least a central threaded bore communicating between the outer and the inner surfaces of said movable segments and wherein said second end section has a plurality of openings in registry with said internal groove and in registry with said threaded bore when said segments are installed within said internal groove and said end sections are brought together in an abutting relationship whereby said threaded members can be threadably engaged within said threaded bores, a tool can be extended through said openings and said threaded members can be tightened against said cylindrical projection through manipulation of said tool to thereby move said segments into a locking position.

4. The artillery shell of claim 3, wherein the outer surface of each of said movable segments includes bevelled surface portions for cooperation with said circumferential internal groove.

5. The artillery shell of claim 4, wherein each of said segments is bevelled and wherein said internal groove is tapered along the side thereof closest to said first end section when said end sections are brought together into an abutting relationship, whereby each of said segments can be moved from an unlocked position into a locking position in which the bevel of said segments bears against said taper of said internal groove to thereby lock said end sections together.

6. The artillery shell of claim 5, wherein said complementary coupling means further comprise retaining means for retaining said segments with said internal groove after installation therewithin.

7. The artillery shell of claim 6, wherein each of said threaded members is provided at one end with an enlarged head portion and wherein said retaining means include a plurality of retaining rings adapted to be installed on said threaded members and a plurality of radial bores located about the bottom peripheral surface of said external groove so as to be in registry with said threaded bores when said segments are installed within said external groove, each of said radial bores having an annular retaining groove located within its internal peripheral surface, whereby said threaded members can be extended through said retaining rings and threadably engaged within said threaded bores, and said segments can be installed within said external groove with said head portions of said threaded members retained by said retaining rings within said radial bores and with said retaining rings engaged within said retaining grooves to thereby hold said segments within said external groove after installation therein.

8. The artillery shell of claim 7, wherein said threaded member has a length greater than or equal to the sum of the thickness of said movable segments and the distance said segments travel between their said locking and their said unlocked positions such that portions of said threaded members protrude through said threaded bores after being threadably engaged therein and wherein said second end section is provided with a plurality of axial internal grooves located within the internal periphery of said axial bore in registry with said openings and said internal groove so that the protruding portions of said threaded members can pass within said axial internal grooves when said end sections are brought together in an abutting relationship.

9. The artillery shell of claim 8, wherein said relative rotation means includes a first row of external splines located about the external periphery of said cylindrical projection on one side of said external groove and at least a first row of internal splines located about the internal periphery of said bore on one side of said internal groove, said internal splines matching said external splines so that said external splines can intermesh with said internal splines to thereby prevent relative rotation between said sections.

10. The artillery shell of claim 9, wherein said relative rotation means further includes a second row of external splines disposed about the external periphery of said cylindrical projection on the other side of said external groove and opposite to said first row of external splines and a second row of internal splines disposed about the internal periphery of said bore on the other side of said groove and opposite to said first row of internal splines.

* * * * *